Oct. 13, 1942.  H. M. DIMICK  2,298,529
SHOCK ABSORBER FOR STRADDLE TRUCKS
Filed July 19, 1941  2 Sheets-Sheet 1

Inventor:
Henry N. Dimick,

Oct. 13, 1942.  H. M. DIMICK  2,298,529
SHOCK ABSORBER FOR STRADDLE TRUCKS
Filed July 19, 1941  2 Sheets-Sheet 2
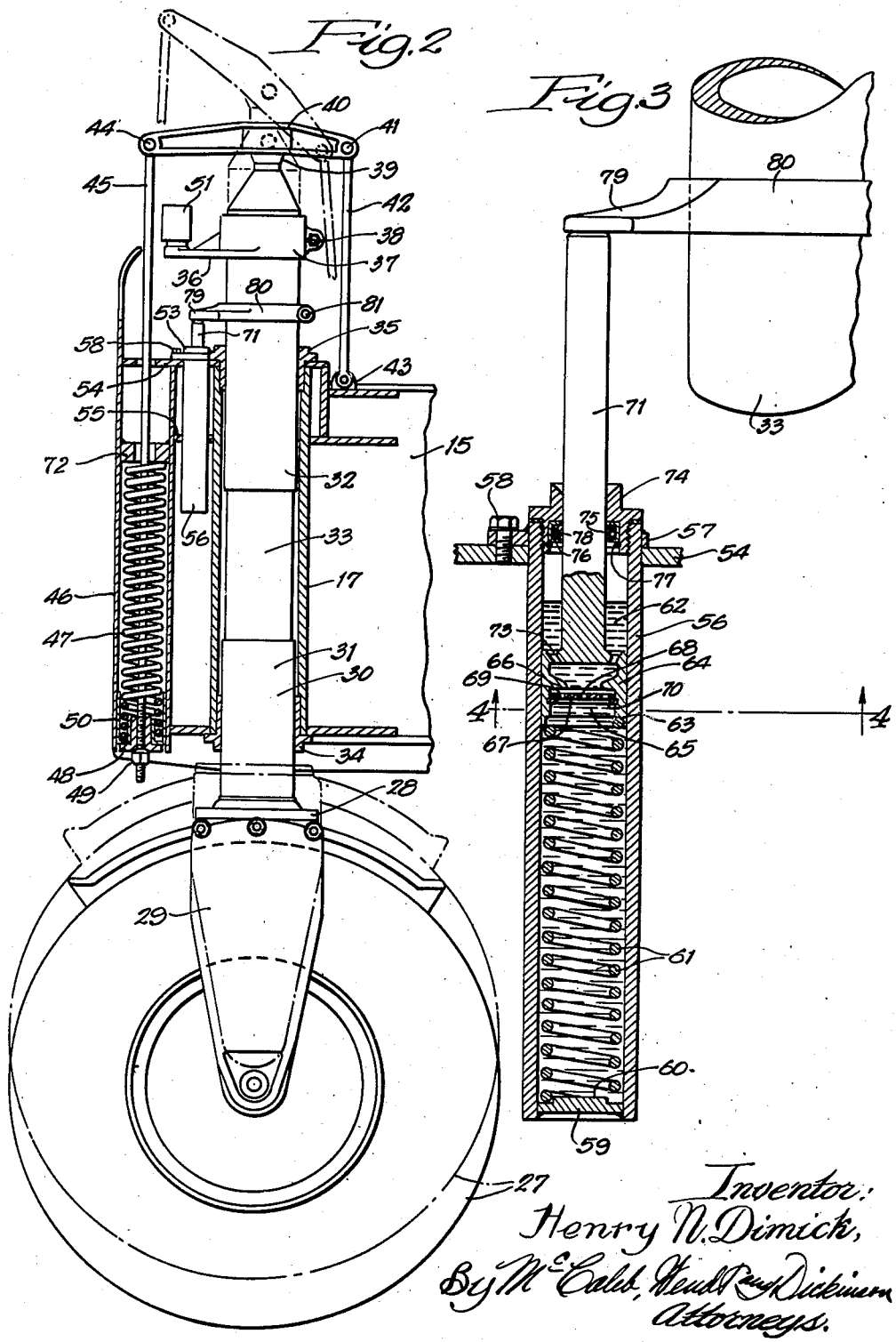

Patented Oct. 13, 1942

2,298,529

UNITED STATES PATENT OFFICE 2,298,529

SHOCK ABSORBER FOR STRADDLE TRUCKS

Henry Noel Dimick, Portland, Oreg., assignor to Willamette Hyster Company, Portland, Oreg., a corporation of Oregon Application July 19, 1941, Serial No. 403,087

14 Claims. (Cl. 267—34)

My invention relates to shock absorbers, and contemplates more specifically, certain improvements in shock absorbers adapted for use in that particular type of equipment known as straddle trucks.

The straddle truck, as in widespread use throughout this and other countries, comprises in brief, a rectangular high platform having vertically depending sides defining, with the platform, a rectangularly arched chassis frame, on which is mounted a power plant such as an automobile truck-type engine.

A supporting wheel is mounted at each of the four corners of the chassis. Each of the wheels is provided with an independently swiveled spring-support mounting, the wheels being arranged for steering by means operable from the driver's seat on the platform.

Since, as the name implies, these vehicles transport their loads suspended beneath the chassis and between the wheels on opposite sides thereof, under-body clearance both vertically and laterally are factors of prime importance as limiting the load size.

Another important factor is overall width, since frequently, as in piling lumber or packaged material such as baled stock, this dimension, or more particularly, the difference between the inside clear width and the overall outside width is the limiting factor in determining the closeness with which adjacent loads can be manipulated for loading or unloading.

Straddle trucks of the type in which my present invention is adapted to be incorporated preferably are arranged for four wheel steering, the rear wheels pivoting in a direction opposite to that of the front wheels on a turning movement of the steering mechanism. This arrangement permits the straddle trucks to turn in a circle having a diameter little, if any, greater than their own length.

The drive is by sprocket and chain to the rear wheels, the drive sprockets, driven through a differential from the engine, being connected by relatively long drive chains to driven sprockets on the rear wheels.

These general features of straddle trucks as above mentioned, or their equivalents, indicate the straddle truck type of vehicles in which my invention is peculiarly adapted to be embodied. Such vehicles, due to their structural requirements and space limitations, are entirely unsuited for the use of conventional, or automotive type, shock absorbers.

Among the more important features of my invention are the following:

My improved shock absorber is not structurally secured to the essential wheel mounting structure of the straddle trucks so as to effect appreciably the full normal springing and steering action of the wheel mounting—the reciprocation and turning of the wheel stem—but is arranged to follow the normal depressing actions of the wheel springs, and to check their undesirable rebound.

My shock absorber is adapted for easy mounting on conventional types of straddle trucks already in the field. It can readily be mounted on any conventional straddle truck, both front and rear wheels thereof—or either—without affecting either the internal or external clearances of such truck.

Spring suspensions on straddle trucks are usually of the rocker arm or walking beam type, the arm being fulcrumed by a universal joint swivel cap upon the upper end of the wheel stem. My shock absorber, not being incorporated in the spring suspension, exerts no upward force on the arm tending to push it away from its fulcrumed seat upon the top of the wheel stem. Consequently, in including my shock absorber, it becomes unnecessary to complicate, or even revise, the present design of rocker arm mounting, to prevent the arm being lifted away from the wheel stem by the action of the shock absorber.

My improved shock absorber assures a substantially uniform shock absorbing action throughout the full effective spring travel of the wheel mounting.

In addition to affording greater comfort to the driver and insulating the truck structure and the load from rebound shock, all due to unevenness of the road, my shock absorber also insulates the chassis from shock of a sudden rise should the truck too suddenly relieve itself of a heavy load which has deeply flexed the suspension springs.

The various parts of the mechanism are readily accessible for mounting, adjustment, repair or replacement, constituting a simple, practical and effective shock absorber which greatly increases the life of the equipment and the comfort of the operator.

Other objects and advantages of my invention will be apparent from the following description and the accompanying drawings.

Referring to the drawings, of which there are two sheets,

Fig. 1 is a view in perspective of a straddle truck of a type for which my invention is adapted;

Fig. 2 is an enlarged fragmentary vertical longitudinal sectional view through a front wheel mounting structure of the truck illustrated in Fig. 1, the wheel being illustrated in normal position in solid lines, and in upwardly deflected position in dotted lines;

Fig. 3 is a further enlarged fragmentary vertical sectional view through a dash pot and plunger arrangement illustrated in Fig. 2;

Fig. 4 is a fragmentary sectional view taken on the plane of the line 4—4 of Fig. 3; and Fig. 5 is a fragmentary sectional view similar to the upper portion of Fig. 2 showing a modified form of wheel spring suspension.

Referring to the drawings in detail, a straddle truck indicated generally by the numeral 10 is provided with conventional rectangular top frame structure 11, engine enclosure 12, operator's seat 13, and steering wheel 14. A vertical side frame 15 is provided on each side of the top frame 11, and is rigidly braced to the top frame as by means of web plates 16.

Cylindrical wheel-stem housings 17 and 18 are provided at the front and rear ends, respectively, of each of the side frames 15. Load raising members 19 are mounted one on each side of the truck, these members being illustrated as of angle construction and extending longitudinally on each side of the truck. Each of the members 19 is connected to a load raising shaft 20, which is telescoped within a tubular support 21, and may be connected to suitable actuating mechanism such as a screw or hydraulic hoist, not illustrated, in a conventional manner. The support tube 21 is braced by tie rods 22 and 23 to anchor the tube 21 against stresses imposed by the starting and stopping of the truck in loaded condition.

Conventional clamp hooks 24 are provided to clamp the load in raised suspended position, as illustrated in Fig. 1, and are connected to suitable actuating mechanism, not illustrated, within the boxed enclosures 25 and 26 at the front and rear ends, respectively, of the truck side frame.

Referring to the illustration of Fig. 2, a pneumatic tired wheel 27 is pivoted in a forked mounting 28 having a removable side plate 29 to facilitate tire changing. A wheel stem 30 is secured to the fork 28 to extend upwardly therefrom, and is provided with smooth cylindrical bearing portions 31 and 32, and may have an intermediate portion 33 of reduced diameter.

The cylindrical bearing portions 31 and 32 are mounted slidably within bearing sleeves 34 and 35, which are secured within the lower and upper ends, respectively, of each wheel stem housing.

A steering lever 36 is provided with a ring clamp 37 which encircles the wheel stem 30, and is secured thereto as by means of a clamp bolt 38. A conventional cross link 51 (see Fig. 1) is provided to link the steering levers of the two coordinated wheels to each other, and a drag link 52 of conventional type also is provided to connect the steering mechanism such as the wheel 14 to one wheel stem.

The upper end of the stem 30 terminates in a ball 39 upon which is supported a socketed rocker arm 40. One end of the rocker arm is connected by a pivot pin 41 to an anchor link 42. The lower end of this link is pivotally connected to an eye 43 welded to the top of the side frame 15. The opposite end of the rocker arm 40 is pivoted by a pin 44 to a rod 45 which extends downwardly through a cylindrical spring enclosure 46 passing centrally through a coil spring 47, and through a spring follower 48.

A nut is threaded onto the lower end of the rod 45 to support the spring follower 48 in adjusted position. A cup-shaped guide member 50, which preferably is of brass, is mounted upon the spring follower 48 and between the spring 47 and the follower, the member 50 having a sliding fit within the spring retaining cylinder 46, to guide the spring and follower within the cylinder and to prevent rattles which otherwise might be caused by the spring follower and the cylinder 46. The spring 47 is held in compression between the follower 48 and a top closure ring 72 welded into the cylinder 46.

A shock absorber comprising one embodiment of my invention includes a fluid dampened piston-and-cylinder device indicated generally by the numeral 53. This fluid damping device is here illustrated as being mounted in openings in structural members 54 and 55 of the side frame 15, and includes a cylinder 56, best illustrated in Fig. 3. An anchoring flange 57 is secured to the cylinder adjacent its upper end as by welding, the cylinder being anchored in position as by means of a cap screw 58 passing through an opening in the flange 57 and threaded into the structural member 54.

A disc 59 is welded into the lower end of the cylinder 56 to form an oil-tight end closure, the disc having a raised center portion with a diameter substantially equal to the internal diameter of a coil spring 61, to locate the spring substantially centrally of the cylinder 56.

The upper end of the coil spring 61 is adapted to seat in a groove 63 in a piston 64 fitted to have a close sliding fit within the cylinder to provide substantially an oil-tight seal between the piston and the cylinder. The cylinder is filled to a depth well above the maximum normal position of the piston 64 with a quantity of suitable fluid 62, such as oil or other shock absorber liquid.

The piston 64 is formed with a central cylindrical opening 65. An inwardly extending flange 66 is spaced upwardly from the lower end of the piston, the flange having a flat lower face disposed perpendicularly to the axis of the cylinder.

A perforated disc 67 is fitted loosely within the cylindrical opening 65 and has a central aperture 68, and a plurality of marginal apertures 69. The marginal apertures, as best illustrated in Fig. 4, are located directly beneath the lower face of the flange 66. The disc is retained in position within the opening 65 by a snap ring 70 seated in an annular groove, provided in the wall of the cylinder about the opening 65, to support the disc 67 normally in slightly downwardly spaced relation from the lower face of the flange 66, as illustrated in Fig. 3.

A stem 71 may be formed integrally with the piston 64 to extend upwardly therefrom, a plurality of openings 73 being provided around the lower end of the stem 71 into the interior of the piston 64, these openings 73 having a total area not less than the total area of all of the openings in the disc 67.

An oil-tight packing gland is threaded into the upper end of the cylinder, and includes a gland nut 74 provided with a central opening to receive the piston stem 71 for free slidable movement therein.

A leather sealing ring 75 is mounted within a metal channel ring 76, which is retained in position within the gland nut 74 by a snap ring 77 seated in a groove provided therefor in the gland 74. The leather ring 75 is held in close wiping relation to the stem 71 by means of a spring ring 78.

The fluid dampened device 53, being illustrated as mounted on the chassis, the upper end of the piston stem 71 is mounted to abut against a projecting and arcuately extending flange 79 on a collar 80, which may be clamped to the wheel stem 33 in adjusted position as by means of a clamp bolt 81. The abutment flange 79 has a flat lower face disposed at right angles to the axis of the wheel stem and is of sufficient width, or arcuate extension, to permit maximum turning movement of the wheel stem 33 in both directions without clearing the piston stem 71, as indicated at 82 in Fig. 4.

In the modified structure illustrated in Fig. 5, the same principal structural parts of the wheel stem and associated parts are retained. The only material change in this structure from that illustrated in Fig. 2, and as previously described, is that the link 42 of Fig. 2 connecting the rocker arm 40 to the eye 43 is, in the structure of Fig. 5, replaced by a rod 42a, which passes through openings 83 and 84 in the structural members of the side frame 15. The lower end of the rod 42a passes through a spring retaining cylinder 85, a spring follower 86 being secured in adjusted position on the lower end of the rod 42a by means of a nut 87.

A coil spring 88 is held in compression between the spring follower 86 and a ring 89, welded into the upper end of the cylinder 85. The spring 88 is somewhat lighter than the main supporting spring 47, illustrated in Fig. 2, and the spring 88 is quite closely coiled so as to bottom after a relatively short movement, after which the main spring 47 will come into play and operate substantially the same as in the structure illustrated in Fig. 2.

The principal advantage of the structure illustrated in Fig. 5 lies in the fact that the relatively light spring 88 is fully operative when the truck is traveling light, and is brought into play by bumps which would not affect the heavier main spring 47. This construction, combined with the shock absorbing characteristics provided by my improved shock absorber, provide for smooth riding under all load conditions from fully light to fully loaded.

It will be noted, particularly in Figs. 3 and 4, that the piston 64 constantly is urged upwardly by the action of the spring 61. When the wheel stem 33 moves upwardly, as upon impact with a bump in a road over which the vehicle is traveling, the stop collar 80 and integrally supported flange 79 moves sharply upward, thereby freeing the piston stem 71 and associated piston 64 for upward movement under the impulse of the coil spring 61.

During the upward movement of the piston 64 and associated parts, pressure is exerted by the oil 62 in the cylinder 56, forcing the plate 67 downwardly to the position illustrated in Fig. 3, thereby permitting the oil to flow downwardly through the piston, the oil passing through the piston openings 73 and the openings 68 and 69 in the plate 67.

Upon reaching the maximum displacement condition of the wheel 27, which we may assume to be that indicated by the dotted line illustration of Fig. 2, the coil spring 47 tends to return the wheel 27 and its associated parts to the normal or solid line position of Fig. 2.

The spring action forces the wheel stem 33 downwardly with respect to the frame 15, thereby forcing the stop collar 80 and its integrally supported flange 79 downwardly. This forces the piston stem 71 and piston 64 downwardly in the cylinder 56, causing increase in pressure against the lower face of the plate 67, and forcing the plate upwardly against the flat lower face of the flange 66. Such action seals the row of marginal holes 69, limiting the flow of oil upwardly through the piston to that which is able to pass through the central opening 68 in the disc 67.

The rate of oil passage through the openings in the plate 67 can be varied by employing oil of different viscosities, and by providing perforated plates 67 having holes of different sizes therein, so that the same assembly can be employed for either light or heavy trucks as required, simply by substituting different plates or by a change in oil specifications.

While my shock absorber is here illustrated specifically as being mounted to control the rebound of one of the front wheels of a straddle truck, it will be apparent to those familiar with the art that the same arrangement can be employed on the rear wheels of the truck.

It will be noted that my shock absorber is arranged to operate between the truck frame or body and the wheel support, and thus does not directly affect the operation of the spring suspension of the wheel. This insures that a proper connection will be maintained between the spring mechanism and the wheel stem at all times, and eliminates the possibility that any upward force might be exerted on the spring pressed rocker arm 40 which might tend to raise the rocker arm from contact with the wheel stem.

While I have illustrated a preferred embodiment of my invention, many modifications may be made without departing from the spirt of the invention, and I do not wish to be limited to the precise details of construction as set forth, but desire to avail myself of all changes within the scope of the appended claims.

Having thus described my invention, what I claim as new and desire to secure by Letters Patent of the United States, is:

1. A shock absorber for a straddle truck having a frame carrying a vertical bearing, a road wheel stem slidably and rotatably mounted in the bearing; said shock absorber comprising a cylinder carried by the frame and arranged parallel to the bearing and having a quantity of fluid therein, a piston mounted in the cylinder and having an opening lengthwise therethrough, a spring mounted to urge the piston upwardly in the cylinder, a valve mounted in the piston opening to free the opening for fluid flow in one direction therethrough and to restrict the opening for fluid flow in the opposite direction therethrough,, and structure forming a separable abutment effective between the piston and the wheel stem and operating independently of normal turning of the wheel stem to free the wheel stem for movement in one axial direction and to resist, by the piston, opposite movement of said wheel stem.

2. A shock absorber for a straddle truck having a cylindrical, substantially vertical wheel stem bearing, a wheel stem slidably mounted in the bearing and having pivotal movement therein, said shock absorber comprising a stop flange carried by the wheel stem, a cylinder mounted on the chassis with its axis parallel to the axis of the bearing, a piston slidably mounted in the cylinder and having a fluid passage opening lengthwise therethrough, a spring held in compression between the cylinder and the piston to urge the piston upwardly, a stem carried by the piston and abutting against the stop flange, and a fluid operated gate movably mounted in the piston to resist movement of the piston in a downward movement in the cylinder and to free the piston in an upward movement therein.

3. A shock absorber for a straddle truck having a chassis, a substantially upright bearing on the chassis, a wheel stem slidably mounted in the bearing and having pivoted steering movement therein, said shock absorber constituting a cylinder secured to the vehicle with its axis disposed parallel to the slidable movement of the wheel stem, a quantity of fluid contained in the cylinder, an abutment secured to the wheel stem, and fluid dampened means mounted within the cylinder and having a portion thereof in contact with the abutment to resist a downward slidable movement of the wheel stem relatively to the chassis, said fluid dampened means having a release element mounted to free the wheel stem for upward slidable movement relatively to the chassis.

4. A shock absorber for a straddle truck having a chassis, a substantially upright bearing on the chassis, a wheel stem slidably mounted in said bearing and having limited pivoted steerable movement therein, and a spring pressed member mounted in engagement with the upper end of the wheel stem and connected to the chassis to constitute a spring suspension between the wheel stem and the chassis, the wheel stem having a free reach above said bearing in the maximum relative depressed position of the wheel stem with respect to the bearing, said shock absorber comprising an abutment clamped to the wheel stem in said free reach, a cylinder secured to the chassis adjacent to said bearing and beneath said abutment, a piston mounted in the cylinder, a valve in the cylinder to resist fluid flow past the piston in one direction only, and means between the piston and the abutment to resist movement of said wheel stem under the action of said spring pressed member.

5. A shock absorber for a straddle truck having a body, a substantially vertical wheel stem bearing mounted on the body, a wheel stem slidably mounted in the bearing and having limited pivotal movement therein, spring pressed means having swiveled connection with the upper end of said wheel stem resiliently to force said wheel stem downwardly relatively to said body, said shock absorber comprising an abutment clamped to the wheel stem above the bearing in the maximum relatively depressed position of the wheel stem with respect to the bearing, and liquid dampened means including a cylinder and a fluid-dampened element cooperating therewith, said means being mounted to contact the lower face of said abutment to resist sudden downward movement of the wheel stem relatively to the bearing, said abutment having an angular width greater than the maximum angular turning movement of the wheel stem to retain contact with the liquid dampened means throughout a maximum turning movement of the wheel stem.

6. A shock absorber for a straddle truck having a body, a cylindrical substantially vertical wheel stem bearing mounted in said body, a wheel stem slidably mounted in the bearing and having pivotal movement therein, the upper end of the wheel stem projecting upwardly from the bearing, a rocker arm socketed on the upper end of the wheel stem, a heavy long-travel spring connected between one end of the rocker arm and said body, a lighter short travel spring connected between the other end of the rocker arm and the body, an abutment on the wheel stem above the maximum upward limit of travel of the bearing, and liquid dampened means secured to the body and having pressure contact with the lower face of said abutment to resist sudden downward movement of the wheel stem relatively to the bearing, said abutment having an angular width greater than the maximum angular turning movement of the wheel stem to retain contact with the liquid dampened means throughout a maximum turning movement of the wheel stem.

7. A shock absorber for a straddle truck having a body, a substantially vertical wheel stem bearing mounted on the body, a wheel stem slidably mounted in said bearing and having pivotal movement therein, and spring pressed means resiliently supporting the body with respect to the wheel stem; said shock absorber comprising a fluid dampened member having straight line movement adapted to be mounted on said body adjacent to said wheel stem, and an abutment member adapted to be clamped to said wheel stem to have pressure contact with said fluid dampened member, to resist sudden upward movement of the body relatively to the wheel stem under the impulse of said spring pressed means.

8. A shock absorber for a straddle truck having a body, a substantially vertical wheel stem bearing mounted on the body, a wheel stem slidably and pivotally mounted in the bearing therein, and spring pressed means resiliently supporting the body with respect to the wheel stem; said shock absorber comprising a cylinder adapted to be mounted with its axis parallel to the wheel stem bearing a quantity of fluid in the cylinder, a piston mounted in the cylinder and free for movement in one direction therein, fluid actuated means mounted to resist movement of the piston in the opposite direction, a piston actuated plunger mounted to extend upwardly from the cylinder, a guide mounted on the cylinder to guide said plunger in straight line movement, and an arcuately arranged abutment member adapted to be clamped in adjusted position to the wheel stem to contact the plunger to resist sudden upward movement of the body relatively to the wheel stem under the impulse of said spring pressed means.

9. A shock absorber for a straddle truck comprising fluid-mediumed co-operating piston and cylinder members, means for mounting one of the members vertically upon the truck frame adjoining a wheel stem bearing, fluid passage means permitting the other member to rise freely but descend only under restricted flow of the medium, an arcuately extended abutment, and means for mounting the abutment on an associated reciprocably and rotatably mounted vertical wheel stem to overlie and abuttingly contact the said other member.

10. A shock absorber for a straddle truck having a chassis and a spring pressed pivoted and vertically slidable wheel stem, said shock absorber comprising a mounting member, a fluid dampened pressure member operatively supported on said mounting member between the truck chassis and the wheel stem, and an arcuately extending abutment having a face thereof disposed in a plane normal to the axis of the wheel stem, and abutting against the fluid dampened member to resist slidable movement of the wheel stem under spring pressure.

11. A shock absorber for a straddle truck having a chassis, a pivoted and vertically slidable wheel stem, and a rocker arm having connection at a point intermediate its ends with the top of the wheel stem, the ends of said rocker arm being connected by spring linkage to the truck chassis to exert a relative chassis-suspending spring pressure between the wheel stem and chassis; said shock absorber comprising a fluid dampened pressure member mounted operatively between the truck chassis and the wheel stem within and free from direct contact with said rocker arm and spring linkage, and an arcuately extending abutment having a face thereof disposed in a plane normal to the axis of the wheel stem and abutting against the fluid dampened member to resist slidable movement of the wheel stem under said spring pressure.

12. A shock absorber for a straddle truck having a chassis with a vertical bearing, a wheel stem slidably journaled in the bearing for pivotal steering movement therein and a walking beam spring suspension including a suspension spring connected to one end of the walking beam, a fulcrum for the walking beam on the upper end of the stem, and an anchor on the chassis for the other end of the walking beam, and in which the bearing, stem, walking beam, suspension spring, and anchor are all substantially in a common vertical plane longitudinally of the truck at one side thereof, the shock absorber comprising cooperating cylinder and piston elements one of which is mounted on the chassis and the other of which is vertically reciprocable in reference thereto, and a stop mounted on the stem and having an arcuately extended abutment surface for engaging the other element to dampen the approach of the chassis to its uppermost position in reference to the stem at all rotary positions of the stem within its arc of steering movement, the shock absorber also lying substantially within said plane.

13. A shock absorber for a straddle truck having a chassis with a vertical bearing, a wheel stem slidably journaled in the bearing for pivotal steering movement therein and a walking beam spring suspension including a suspension spring connected to one end of the walking beam, a fulcrum for the walking beam on the upper end of the stem, and an anchor on the chassis for the other end of the walking beam, and in which the bearing, stem, walking beam, suspension spring, and anchor are all substantially in a common vertical plane longitudinally of the truck at one side thereof, the shock absorber comprising cooperating cylinder and piston elements one of which is mounted on the chassis and the other of which is vertically reciprocable in reference thereto, and a stop mounted on the stem having an abutment surface for engaging the other element to dampen the approach of the chassis to its uppermost position in reference to the stem, the shock absorber also lying substantially within said plane.

14. A shock absorber for a straddle truck having a chassis and, at each corner thereof, a steerable road wheel with a vertical stem slidably and rotatably journaled in a vertical bearing in the chassis and a walking beam spring suspension comprising a beam fulcrumed on the upper end of the stem with an anchoring connection between the chassis and one end of the beam and a suspension spring connected between the chassis and the other end of the beam, each shock absorber comprising coacting members having telescoping relative movement fluid-retarded in one direction and comparatively free in the other direction, mounting structures on the chassis and on the stem respectively, one structure mounting one of the members and supporting the other member for said movement relative to the one member, and the other mounting structure carrying a horizontal abutment surface extended arcuately of the axis of the stem for engaging the said supported member of the shock absorber to cushion the rise of the chassis as it approaches the upward limit of its spring suspended movement relative to the stem regardless of the turned position of the stem within the range of its steering arc.

HENRY NOEL DIMICK.